United States Patent
Wang

(10) Patent No.: US 7,688,821 B2
(45) Date of Patent: Mar. 30, 2010

(54) METHOD AND APPARATUS FOR DISTRIBUTING DATA PACKETS BY USING MULTI-NETWORK ADDRESS TRANSLATION

(75) Inventor: Zhiming Wang, Hebei (CN)

(73) Assignee: O2Micro International Ltd., Georgetown (KY)

( * ) Notice: Subject to any disclaimer, the term of this patent is extended or adjusted under 35 U.S.C. 154(b) by 581 days.

(21) Appl. No.: 11/602,669

(22) Filed: Nov. 21, 2006

(65) Prior Publication Data

US 2008/0117900 A1 May 22, 2008

(51) Int. Cl.
*H04L 12/56* (2006.01)
*G06F 15/16* (2006.01)
(52) U.S. Cl. .............. 370/389; 370/392; 370/401; 709/245; 709/246
(58) Field of Classification Search .......... None
See application file for complete search history.

(56) References Cited

U.S. PATENT DOCUMENTS

| | | | | |
|---|---|---|---|---|
| 5,793,763 A | * | 8/1998 | Mayes et al. | 370/389 |
| 6,047,325 A | * | 4/2000 | Jain et al. | 709/227 |
| 6,145,030 A | * | 11/2000 | Martwick | 710/36 |
| 6,496,935 B1 | * | 12/2002 | Fink et al. | 726/13 |
| 6,754,709 B1 | * | 6/2004 | Gbadegesin | 709/227 |
| 7,315,541 B1 | * | 1/2008 | Housel et al. | 370/392 |
| 2002/0065938 A1 | * | 5/2002 | Jungck et al. | 709/246 |
| 2002/0141438 A1 | * | 10/2002 | Smith et al. | 370/465 |
| 2004/0049701 A1 | * | 3/2004 | Le Pennec et al. | 713/201 |
| 2005/0125798 A1 | * | 6/2005 | Peterson | 718/105 |
| 2007/0248090 A1 | * | 10/2007 | Budhani et al. | 370/392 |

* cited by examiner

*Primary Examiner*—Chirag G Shah
*Assistant Examiner*—Jenkey Van
(74) *Attorney, Agent, or Firm*—Wang Law Firm; Li K. Wang

(57) ABSTRACT

A data packets distributor for transferring a data packet from a source address to a destination address is provided. The data packet distributor has a plurality of predefined addresses and a data packet distributing unit. Each of the plurality of addresses indicates a network processing unit coupled to the data packet distributing unit. The data packet distributing unit is capable of forwarding a data packet to at least one of the plurality of predefined addresses for processing by using a first Network Address Translation (NAT) operation and further capable of forwarding the data packet to the destination address by using a second Network Address Translation (NAT) operation.

10 Claims, 2 Drawing Sheets

METHOD AND APPARATUS FOR DISTRIBUTING DATA PACKETS BY USING MULTI-NETWORK ADDRESS TRANSLATION

FIELD OF THE INVENTION

The invention relates to data packets transferring, and in particular, to data packets distributors that employ multiple Network Address Translation (NAT) operations to distribute data packets.

BACKGROUND OF THE INVENTION

NAT is a process for translation of IP address. It enables a local-area network (LAN) to use a first set of network addresses for internal traffic and a second set of network addresses for external traffic. A network device that is capable of performing NAT operations is located preferably where a LAN meets a wide area network (WAN). The most commonly used network address is based on the Internet Protocol, the IP address. The first set of IP addresses for internal traffic can be reused in many different LANs and are not unique. The second set of IP addresses for external traffic are unique and can not be reused by other networks. Each of the first set of IP addresses is assigned to a host in the LAN. Therefore, when a first host in a LAN intends to communicate with a second host on the Internet, it first transmits packets to a network device that is capable of performing NAT operations. In the IP header of each packet, there is a source address and a destination address. The source address is one of the first set of addresses that is assigned to the host and cannot be used outside the LAN. Therefore, in order to transmit the data packet to its destination address, the network device replaces the source address with an address from the second set of addresses which can be used for external communication. The operation of replacing the source address of the packet with an address from the second set of addresses is part of the NAT process. After the NAT, the resulting source address of the packet can be uniquely used for external traffic, such as Internet communication.

Nowadays, many network devices such as routers, firewalls, and ISDN routers are capable of performing NAT operations. All these devices employ only one NAT operation to transfer a data packet from a source address to a destination address.

With the rapid development of information technology, the functions provided by network devices are becoming more and more powerful and sophisticated. In today's network devices, besides basic functions, such as routing, many other functions or processing procedures, such as content-filtering, anti-virus, encryption, decryption and anti-spam, can be provided. These additional functions can be accomplished either in one processing unit or in many processing units. Performing some of the functions or processing procedures, such as an anti-virus processing procedure, is very complicated and time-consuming. To solve the problem, these additional processing procedures are usually executed by different processing units. A CPU in the network device is used to distribute data packets to different processing units for processing. However, this distribution method results in a huge consumption of the CPU resource. Thus, the above-mentioned method greatly limits the system performance.

To solve this problem many solutions, such as using a more powerful CPU, providing extra hardware, and employing software implementation, have been proposed. However, the use of powerful CPU, extra hardware, or extra software implementation increases the system complexity and cost.

Therefore, it is to an improved solution that is capable of transmitting data packets to various data packets processing units without increasing the cost and system complexity that the present invention primarily directs.

SUMMARY OF THE INVENTION

The present invention provides a data packets distributor that employs multiple NAT operations to transmit data packets to various data packets processing units. Since the NAT is a standard function of many network devices, the present invention is capable of transferring data packets to various data packets processing units according to system requirement without extra CPU or software operation. Consequently, system complexity and the cost can be reduced.

In one embodiment of the invention, there is provided a data packets distributor for transferring a data packet from a source address to a destination address. The data packets distributor has a plurality of predefined addresses and a data packet distributing unit. Each of the plurality of predefined addresses indicates a location of a processing unit. The data packet distributing unit is in communication with the processing units indicated by the plurality of predefined addresses. The data packet distributing unit is capable of transferring the data packet to at least one of the plurality of processing unit by employing a first NAT operation. The data packet distributing unit is further capable of transferring the processed data packet to the destination address by using a second NAT operation. The plurality of processing units transfer the data packet to the data packet distributing unit after the plurality of processing units complete processing of the data packet. When the data packet distributing unit of the network distributor receives the data packet from one of said plurality of processing units, the data packet distributing unit further selectively transfers the data packet to one of the rest of the plurality of processing units by using a NAT operation. The data packet distributing unit of the network distributor stops transferring the data packet to the destination address when one of the plurality of processing units detects that the data packet is unqualified for transferring to the destination address.

In another embodiment of the invention, there is also provided a network system for transferring a data packet from a source address to a destination address. The network system has a plurality of processing units and a data packet distributing unit. The data packet distributing unit of the network system is coupled to the plurality of processing units. And each of the plurality of processing units has a predefined address. The data packet distributing unit is capable of transferring the data packet to at least one of the plurality of processing units for processing by using a first NAT operation. The data packet distributing unit is further capable of transferring the data packet to the destination address by using a second NAT operation. The plurality of processing units transfer the data packet back to the data packet distributing unit after the plurality of processing units complete processing of the data packet. When the data packet distributing unit of the network system receives the data packet from one of the plurality of processing units, the data packet distributing unit further selectively transfers the data packet to one of the rest of the plurality of addresses by using a NAT operation. The data packet distributing unit of the network system stops transferring the data packet to the destination address when one of the plurality of the processing units detects that the data packet is unqualified for transferring to the destination address.

In yet another embodiment of the invention, there is also provided a method for transferring a data packet from a source address indicative of a first location to a destination address indicative a second location by employing multiple NAT operations. The method includes receiving a data packet from the source address indicative the first location at the data packet distributing unit, transferring the data packet from the data packet distributing unit to a processing unit of the plurality of processing units by employing a first NAT operation, processing the data packet at the processing unit, transferring the data packet back to the data packet distributing unit, and transferring the processed data packet from the data packet distributing unit to the destination address indicative of the second location by employing a second NAT operation. The method also includes receiving at the data packet distributing unit the data packet from the processing units, transferring the packet from the data packet distributing unit to one of the rest of the plurality of processing units. The method further includes determining at the processing unit whether the data packet is qualified for transferring and dropping the data packet at the processing unit if the data packet is unqualified for transferring.

BRIEF DESCRIPTION OF THE DRAWINGS

Features and advantages of embodiments of the invention will become apparent as the following Detailed Description proceeds, and upon reference to the Drawings, where like numerals depict like elements, and in which.

DETAILED DESCRIPTION OF THE INVENTION

Figure 1:
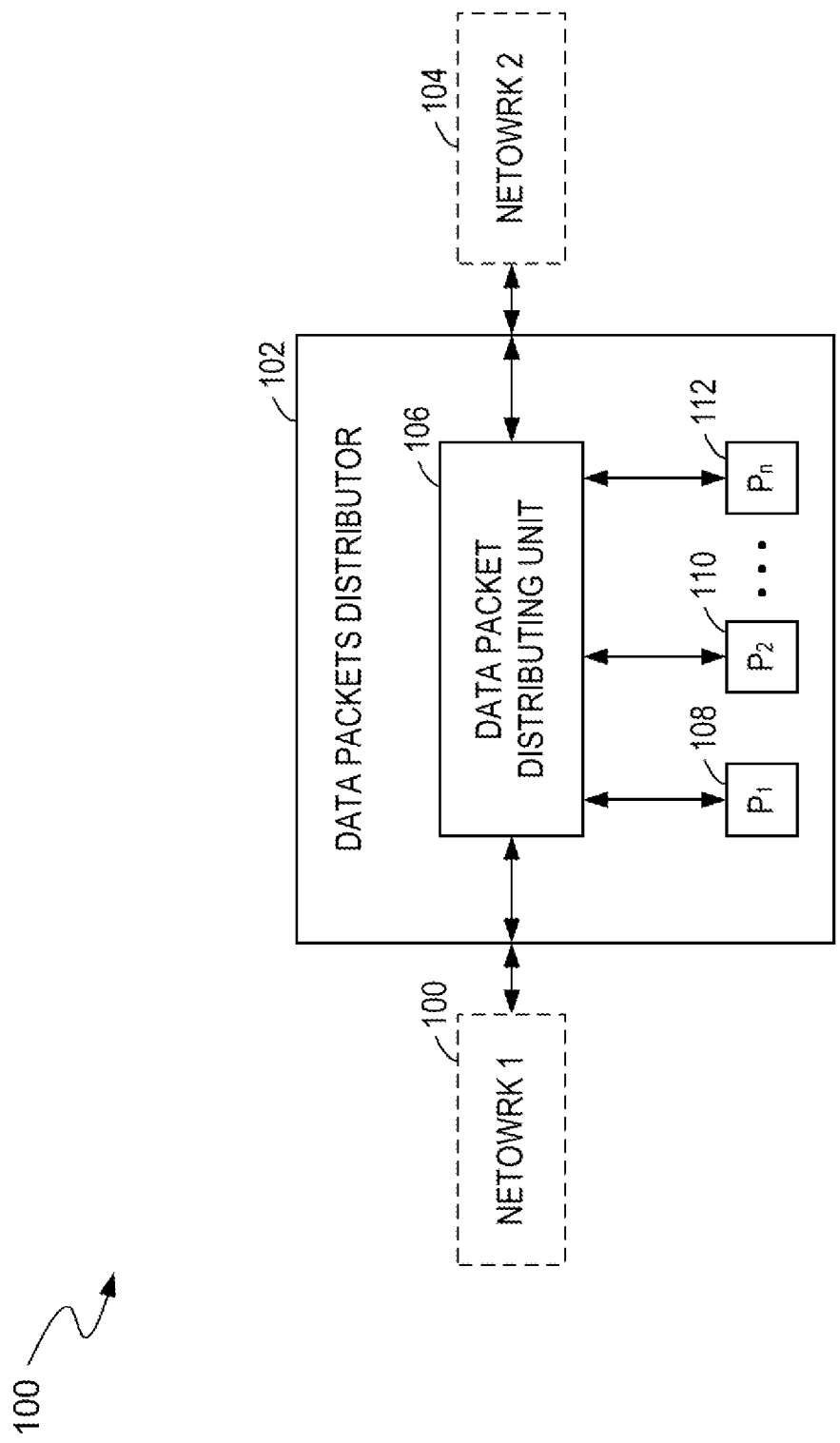
FIG. 1 illustrates an exemplary topology of a network distributor for transferring a data packet from a source address to a destination address according to the invention.

FIG. 1 illustrates an exemplary topology of a network distributor for transferring a data packet from a source address to a destination address. In general, a data packets distributor 102 is in communication with a first network 1 100 and a second network 2 104. The data packets distributor 102 is capable of receiving data packets from either network 1 100 or network 2 104. The data packets distributor 102 also includes a data packet distributing unit 106 and a plurality of addresses. Each address indicates the address of an external data packets processing unit, such as P1 108, P2 110... or Pn 112 as shown in FIG. 1. The data packet distributing unit 106 is further in communication with a plurality of external data packets processing units P1 108, P2 110 . . . Pn 112. As mentioned above, each of the plurality of external data packets processing units P1 108, P2 110 . . . Pn 112 is assigned a unique address. The plurality of addresses can be either statically or dynamically mapped to the plurality of processing units P1 108, P2 110 . . . Pn 112. Each of the plurality of processing units P1 108, P2 110 . . . Pn 112 is capable of performing at least one special processing procedure, such as content-filtering, anti-virus, encryption, decryption anti-spam, etc. The data packet distributing unit 106 is further capable of determining which processing unit the data packet needs to be transferred to.

The data packets distributor 102 is capable of receiving data packets from either the network 1 100 or the network 2 104. When the network 1 100 transfers a data packet that has a source address and a destination address to the network 2 104, the data packet is received at the data packets distributor 102. At the data packet distributing unit 106 of the data packets distributor 102, the destination address of the data packet is replaced by a first address that indicates a location of a certain data packets processing unit (e,g, P1 108) among P1 108, P2 110 . . . Pn 112. Replacing the destination address with the first address is referred to as a first NAT operation herein. According to the first address, the data packet is transferred to P1 108. At P1 108, the data packet is processed, according to some of the procedures that executed by the P1 108, such as content-filtering, anti-virus, encryption, decryption anti-spam, etc. After processing, the data packet is transferred back to the data packet distributing unit 106 from P1 108.

After the processed data packet is received at data packet distributing unit 106, the data packet distributing unit 106 checks whether the data packet needs to be transferred to other processing units for further processing. If further processing procedure is required, the data packet distributing unit 106 may replaces the destination address of the data packet with a second address that indicates a second processing unit among the plurality of processing units P1 108, P2 110 . . . Pn 112 and transmits the data packet to the second processing unit for further processing. Replacing the destination address with the second address is referred to as a second NAT operation herein.

When the data packet distributing unit 106 detects that the data packet has been transferred to all the processing units it needs to be transferred to, the data packet distributing unit 106 may replace the current destination address of the data packet with its original destination address. Finally, the data packet is transmitted to the network 2 104. Replacing the second address with the network's destination address is referred to as a final NAT operation herein.

It is appreciated by those skilled in the art that in the aforementioned embodiment of the invention, the data packets distributor 102 employs multiple NAT operations that contains at least two NAT operations to transfer the data packet from its source address to its destination address. In the course of distributing the data packet, the concept of NAT is employed and no CPU or software is involved. Therefore, the goal of a reduced cost and system complexity can be achieved.

For some special processing procedures, such as content-filtering, anti-spam and anti-virus, the associated processing units that handle the special processing procedures may check whether the data packet meets security requirements and transmission requirements. If the associated processing units detect that a data packet does not comply with the system security requirement, such as containing some virus, it may drop the data packet and log the dropping of the data packet. If any processing unit among P1 108, P2 110 . . . Pn 112, drops the data packet, the transmission of the data packet stops.

Figure 2:
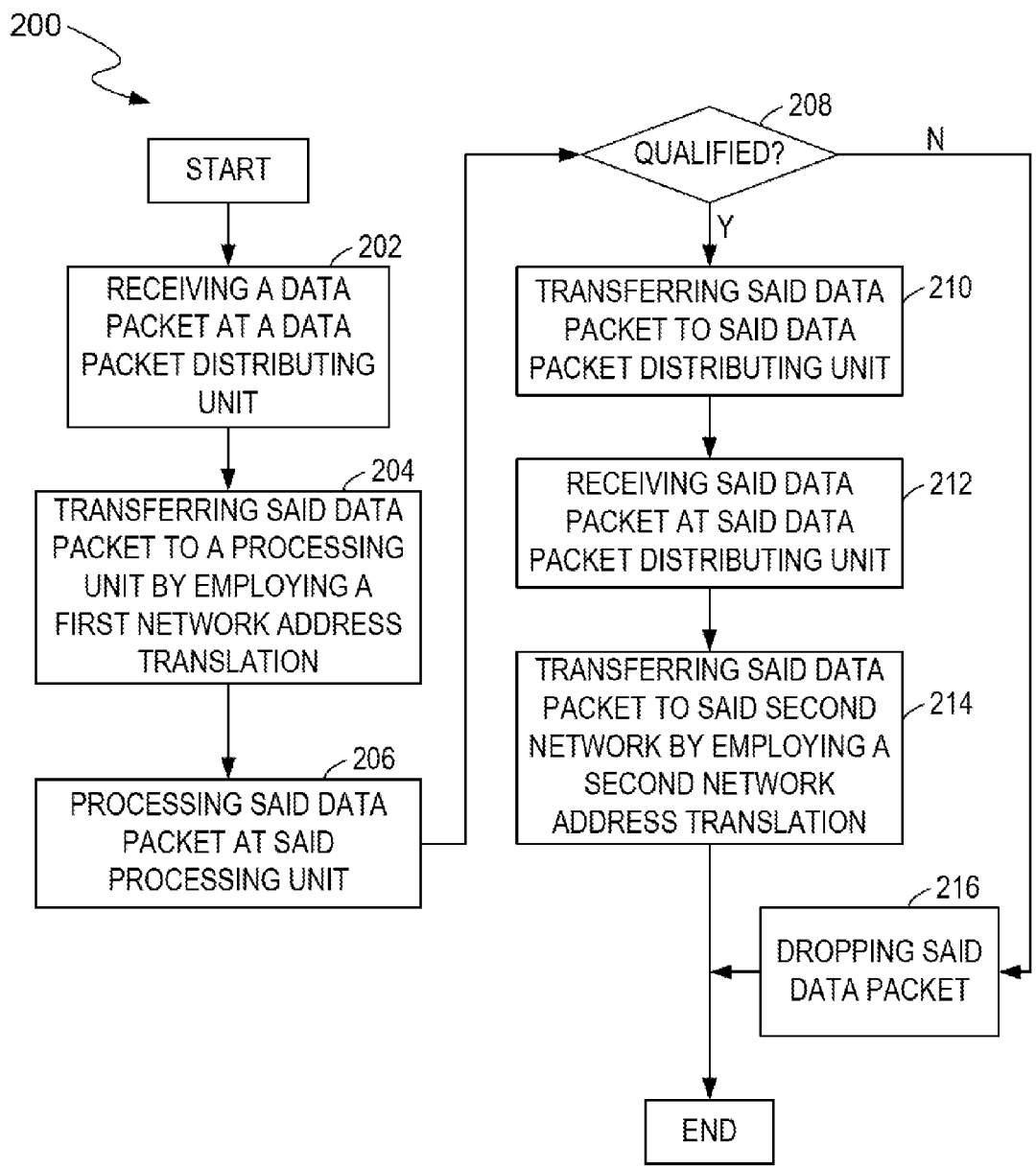
FIG. 2 illustrates an exemplary flow chart of a method of using multiple NAT operations to transfer a data packet from a source address to a destination address.

FIG. 2 illustrates an exemplary flow chart of a method for using multiple NAT operations to transfer a data packet from a source address indicative of a first location to a destination address indicative of a second location. The method includes, receiving a data packet indicative of the first location at a data packet distributing unit, step 202, transferring the data packet from the data packet distributing unit to a processing unit by employing a first NAT operation, step 204, processing the data packet at the processing unit, step 206. The method further includes detecting at the processing unit whether the data packet has fulfilled system requirements, step 208, forwarding the processed packet back to the data packet distributing unit if the data packet has fulfilled the system requirements, step 210, dropping the processed packet if the data packet has not fulfilled the system requirements, step 216, receiving the data packet at the data distributing unit, step 212, and transferring the processed data packet from the data packet distributing unit to the destination address indicative of said second location by using a second NAT operation, step 214.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A data packets distributor for transferring a data packet from a source address to a destination address, comprising:
   a plurality of predefined addresses, each predefined address indicating a location of a processing unit; and
   a data packet distributing unit coupled to a plurality of said processing units, said data packet distributing unit for determining a set of said processing units from said plurality of said processing units to execute a set of predefined procedures on said data packet respectively and transferring said data packet to a set of said predefined addresses in sequence by using corresponding NAT operations, said set of said predefined addresses indicating said locations of said set of said processing units respectively,
   said data packet distributing unit further for forwarding said processed data packet to said destination address by using a final NAT operation;
   wherein transferring the data packet to a set of predefined addresses in sequence by using corresponding NAT operations comprises:
   transferring said data packet from said data packet distributing unit to one of said processing units by using a corresponding NAT operation of said plurality of said NAT operations;
   processing said data packet at said processing unit;
   receiving at said data packet distributing unit said data packet from said processing unit;
   determining at said data packet distributing unit whether said data packet has been transferred to each of said set of said processing units;
   if said packet has not been transferred to each of said set of said processing unit, transferring said data packet from said data packet distributing unit to one of the rest of said set of said processing units by using a corresponding NAT operation of said plurality of said NAT operations, then processing said data packet at said processing unit;
   if said packet has been transferred to each of said set of said processing unit, transferring said data packet from said data packet distributing unit to said destination address indicative of said second location by using a final NAT operation of said plurality of said NAT operations.

2. The data packets distributor of claim 1, wherein, said set of said processing units transfer said data packet to said data packet distributing unit after said set of said processing units complete processing said data packet.

3. The data packets distributor of claim 2, wherein, when said data packet distributing unit receives said data packet from one of said set of said processing units, said data packet distributing unit further selectively transfers said data packet to one of the rest of said set of said predefined addresses by using a corresponding one of said NAT operations.

4. The data packets distributor of claim 1, wherein, said data packet distributing unit stops transferring said data packet to said destination address when one of said set of said processing units detects that said data packet is unqualified for transferring to said destination address.

5. A network system for transferring a data packet from a source address to a destination address, comprising:
   a plurality of processing units, each processing unit having a predefined address; and
   a data packet distributing unit coupled to said plurality of processing units, said data packet distributing unit for determining a set of said processing units from said plurality of said processing units to execute a set of predetermined procedures on said data packet respectively, and transferring said data packet to said set of said processing units in sequence by using corresponding NAT operations, said data packet distributing unit further for transferring said data packet to said destination address by using a final NAT operation;
   wherein transferring the data packet to a set of said processing units in sequence by using corresponding NAT operations comprises:
   transferring said data packet from said data packet distributing unit to one of said processing units by using a corresponding NAT operation of said plurality of said NAT operations;
   processing said data packet at said processing unit;
   receiving at said data packet distributing unit said data packet from said processing unit;
   determining at said data packet distributing unit whether said data packet has been transferred to each of said set of said processing units;
   if said packet has not been transferred to each of said set of said processing unit, transferring said data packet from said data packet distributing unit to one of the rest of said set of said processing units by using a corresponding NAT operation of said plurality of said NAT operations, then processing said data packet at said processing unit;
   if said packet has been transferred to each of said set of said processing unit, transferring said data packet from said data packet distributing unit to said destination address indicative of said second location by using a final NAT operation of said plurality of said NAT operations.

6. The network of claim 5, wherein, said set of processing units transfer said data packet back to said data packet distributing unit after said set of said processing units complete processing said data packet.

7. The network system of claim 6, wherein, when said data packet distributing unit receives said data packet from one of said set of processing units, said data packet distributing unit further selectively transfers said data packet to one of the rest of said set of said processing unit by using a corresponding one of said NAT operations.

8. The network system of claim 5, wherein said data packet distributing unit stops transferring said data packet to said destination address when one of said set of said processing units detects that said data packet is unqualified for transferring to said destination address.

9. A method of using a plurality of NAT operations to transfer a data packet from a source address indicative of a first location to a destination address indicative of a second location, comprising the steps of:
   receiving a data packet at a data packet distributing unit from said source address indicative of said first location;
   transferring said data packet to a set of processing units for processing said data packet in sequence by using corresponding NAT operations of said plurality of said NAT operations at said data packet distributing unit;

transferring said data packet from said data packet distributing unit to said destination address indicative of said second location by using a final NAT operation of said plurality of said NAT operations;

wherein transferring the data packet to a set of said processing units in sequence by using corresponding NAT operations comprises the steps of:

transferring said data packet from said data packet distributing unit to one of said processing units by using a corresponding NAT operation of said plurality of said NAT operations;

processing said data packet at said processing unit;

receiving at said data packet distributing unit said data packet from said processing unit;

determining at said data packet distributing unit whether said data packet has been transferred to each of said set of said processing units;

if said packet has not been transferred to each of said set of said processing unit, transferring said data packet from said data packet distributing unit to one of the rest of said set of said processing units by using a corresponding NAT operation of said plurality of said NAT operations, then go to the step of processing said data packet at said processing unit;

if said packet has been transferred to each of said set of said processing unit, go to the step of transferring said data packet from said data packet distributing unit to said destination address indicative of said second location by using a final NAT operation of said plurality of said NAT operations.

10. The method of claim 9, further comprising:

determining at each of said set of said processing units whether said data packet is qualified for transmission; and dropping said data packet at said corresponding processing unit if said data packet is unqualified for transmission.

* * * * *